(12) United States Patent
Gregrich et al.

(10) Patent No.: US 8,356,637 B2
(45) Date of Patent: Jan. 22, 2013

(54) HYDRAULIC SUPPLY HOSE INCLUDING AN INTEGRAL TENSILE LOAD MEMBER

(75) Inventors: Glenn M. Gregrich, Stow, OH (US); Iani Manas, Orange, OH (US); Charles T. Simmons, Kent, OH (US)

(73) Assignee: Eaton Corporation, Cleveland, OH (US)

( * ) Notice: Subject to any disclaimer, the term of this patent is extended or adjusted under 35 U.S.C. 154(b) by 791 days.

(21) Appl. No.: 12/406,413

(22) Filed: Mar. 18, 2009

(65) Prior Publication Data

US 2010/0236655 A1    Sep. 23, 2010

(51) Int. Cl.
    *F16L 11/00*    (2006.01)
(52) U.S. Cl. .......................................... 138/125; 138/137
(58) Field of Classification Search .................. 138/125, 138/137
    See application file for complete search history.

(56) References Cited

U.S. PATENT DOCUMENTS

| | | | |
|---|---|---|---|
| 1,104,777 A | | 7/1914 | Cobb |
| 2,962,050 A * | 11/1960 | Ramberg et al. .............. 138/125 |
| 3,062,241 A * | 11/1962 | Brumbach .................... 138/125 |
| 3,334,165 A * | 8/1967 | Koch ............................ 264/135 |
| 3,463,197 A | | 8/1969 | Slade |
| 3,905,398 A * | 9/1975 | Johansen et al. .............. 138/124 |
| 4,130,139 A * | 12/1978 | Haren ........................... 138/125 |
| 4,196,464 A * | 4/1980 | Russell ......................... 361/215 |
| 4,303,457 A * | 12/1981 | Johansen et al. .............. 156/149 |
| 4,402,346 A * | 9/1983 | Cheetham et al. ............ 138/129 |
| 5,052,444 A * | 10/1991 | Messerly et al. ............. 138/125 |
| 6,112,771 A * | 9/2000 | Aoyagi et al. ................ 138/127 |
| 6,257,280 B1 * | 7/2001 | Marena ........................ 138/125 |
| 6,536,479 B2 * | 3/2003 | Wilson et al. ................ 138/137 |
| 6,776,195 B2 * | 8/2004 | Blasko et al. ................ 138/141 |
| 2002/0100516 A1 * | 8/2002 | Powell et al. ................ 138/125 |
| 2004/0058111 A1 * | 3/2004 | Manas-Zloczower et al. .......................... 428/36.91 |
| 2005/0211323 A1 * | 9/2005 | Takagi et al. ................ 138/121 |

* cited by examiner

*Primary Examiner* — James Hook
(74) *Attorney, Agent, or Firm* — Quinn Law Group, PLLC

(57) ABSTRACT

A supply hose includes a core tube, a first layer, a second layer, and a sheath. The core tube defines a hollow interior that surrounds a central axis and is configured to transport fluid therethrough. The first layer and/or the second layer provide tensile strength to the supply line. The first layer is disposed about the core tube and includes a plurality of first fibers. The first fibers are braided about the core tube at a first angle, relative to the central axis. The second layer is disposed directly on the exterior surface of the first layer and includes a plurality of second fibers. The second fibers are braided about the exterior surface of the first layer at a second angle, relative to the central axis. The sheath may be disposed about the second layer.

5 Claims, 2 Drawing Sheets

HYDRAULIC SUPPLY HOSE INCLUDING AN INTEGRAL TENSILE LOAD MEMBER

TECHNICAL FIELD

The present invention relates to a hydraulic supply hose including an integral tensile load member.

BACKGROUND OF THE INVENTION

A pump is typically connected to a length of pipe and inserted down into a well. The length of pipe may be formed from a plurality of individual smaller lengths of pipe that are attached to one another as the pump is lowered down into the well. In addition, the weight of the pump may be supported by the pipe. For example, a length of pipe that is approximately 2,000 feet long may be attached to the pump that is disposed approximately 2,000 feet down in the well. To achieve the 2,000 foot length of pipe, an individual smaller length of pipe is attached to the pump and lowered down into the well. Next, another individual small length of pipe is attached to the first length of pipe so that the pump can be lowered a little further down into the well. This process continues until the desired depth of 2,000 feet is achieved. Likewise, to remove the pump from the well, the process is reversed and the individual smaller lengths of pipe are removed from one another as the pump is raised from the well. Attaching and detaching the individual lengths of pipe together to position the pump within the well takes a significant amount of time and labor.

SUMMARY OF THE INVENTION

A hydraulic supply hose extends along a central axis and defines a hollow interior. The supply hose includes a first layer and a second layer. The first layer includes a plurality of first fibers that are braided about the hollow interior at a first angle, relative to the central axis. The second layer includes a plurality of second fibers that are braided about the hollow interior at a second angle, relative to the central axis. The first angle is substantially greater than the second angle.

A supply hose includes a core tube, a first layer, a second layer, and a sheath. The core tube extends along a central axis and defines a hollow interior configured for transporting fluid therethrough. The first layer is disposed about the core tube and presents an exterior surface. The first layer includes a plurality of first fibers that are braided about the core tube at a first angle of between 52 degrees and 56 degrees, relative to the central axis. The second layer is disposed directly on the exterior surface of the first layer. The second layer includes a plurality of second fibers that are braided about the exterior surface of the first layer at a second angle of between 28 degrees and 32 degrees, relative to the central axis. The sheath is disposed about the second layer.

A method of installing a pump in a well includes providing a supply hose defining a hollow interior that is configured for fluid to flow therethrough. The supply hose includes a plurality of first fibers that are braided about the hollow interior at a first angle, relative to the central axis, and a plurality of second fibers that are braided about the first fibers at a second angle, relative to the central axis. The supply hose is attached to the pump such that the supply hose is in fluid communication with the pump. The pump is lowered into the well with the supply hose such that the weight of the pump is substantially supported by the supply hose.

By providing a supply hose with significant strength, the supply hose may be able to significantly support the weight of a pump within a well. Not only will the supply hose be able to support the weight of the pump, but the hose is able to be unwound as the pump is lowered into the well. By lowering the pump into the well by unwinding the hose, significant savings may be achieved by reducing the amount of time and labor that is required to lower the pump into the well.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
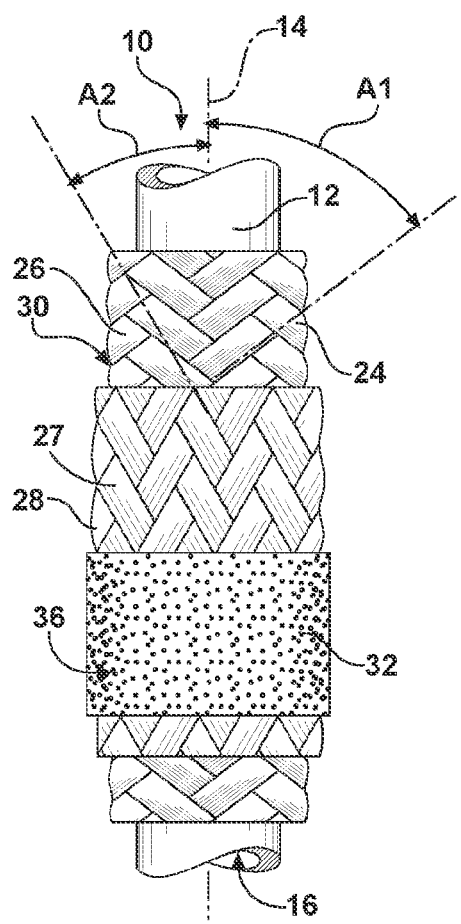
FIG. 1 is a schematic side view of a hydraulic supply hose, partially cut away to show a core tube, a first layer, a second layer, and a sheath.
Figure 3:
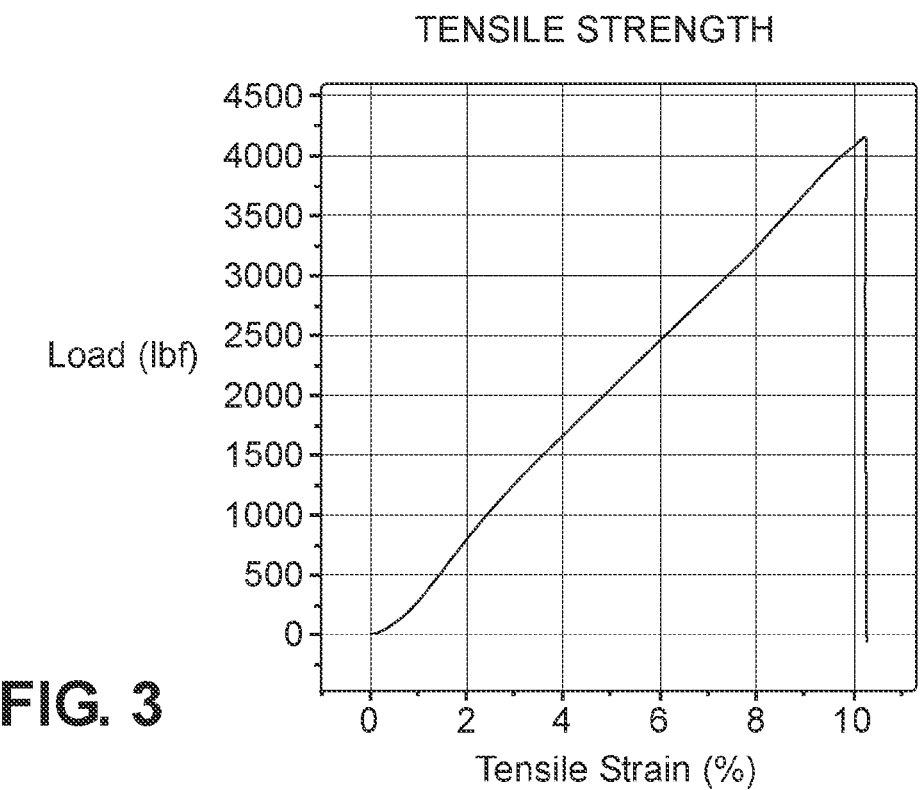
FIG. 3 is a chart showing load versus tensile strain for the supply hose.
Figure 4:
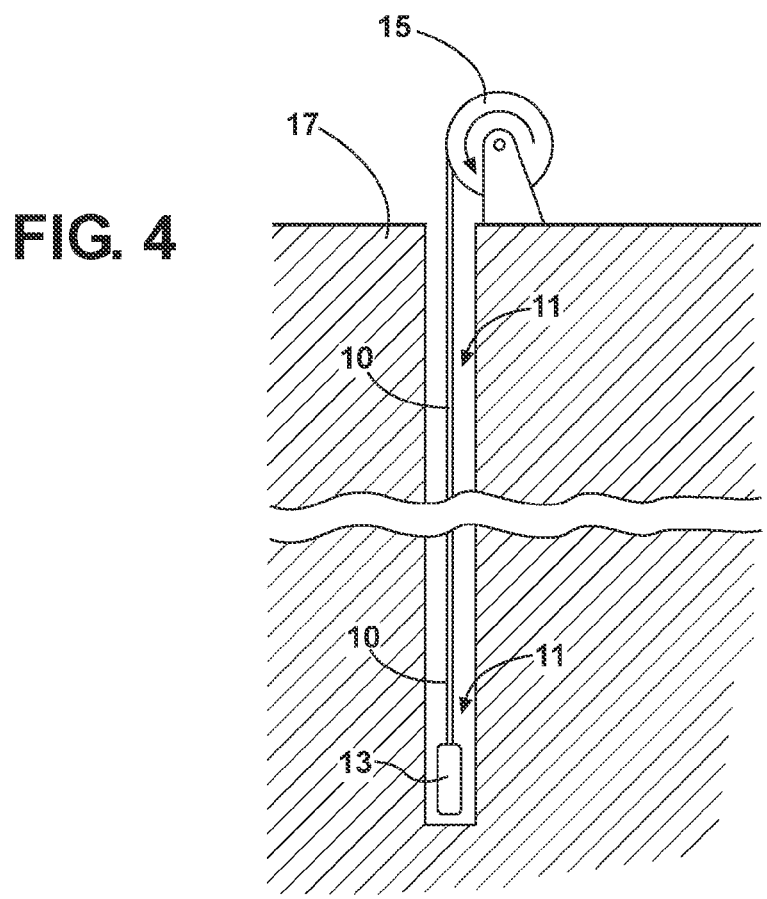
FIG. 4 is a schematic cross-sectional side view of a pump disposed within a well in the ground with the pump being operatively supported by the supply hose.

Referring to the drawings, wherein like reference numbers refer to like components, FIG. 1 shows a hydraulic supply hose at 10. The hose may be used to transport fluid to a down-hole well 11 via a submersible pump 13, as illustrated in FIG. 4. The well 11 may be dug into the ground 17. The supply hose 10 may be attached to the pump and lowered into the well 11, as shown in FIG. 4. The supply hose 10 may be wound around a hose reel 15 and unrolled to lower the pump 13 into the well 11. The supply hose 10 is configured such that the weight of the pump 13 is substantially supported by the supply hose 10. For example, if the well 11 has a depth of 2,000 feet (i.e., 609.6 meters), the supply hose 10 supports the weight of the pump 13. This means that the supply hose 10 substantially supports the weight of the pump 13, the length of the supply hose 10, and any fluid contained therein at the depth of 2,000 feet. Therefore, supply hose 10 is configured to have sufficient tensile strength to substantially support the weight of the pump 13 at the desired depth of the well 11. The supply hose 10 may support at least 4,000 pounds (lbf) with a tensile strain up to least 10% before failure, as shown in FIG. 3. However, it should be appreciated that the supply hose 10 may be used in other applications as known to those skilled in the art.

The supply hose 10 extends along a central axis 14 and defines a hollow interior 16 that is configured to transport fluid therethrough. The supply hose 10 includes a core tube 12 that surrounds the central axis 14 and defines the hollow interior 16 therein. The core tube 12 may be formed as a co-extruded tube having a core layer 18 and a backing layer 20. The core layer 18 defines the hollow interior 16 and the backing layer 20 surrounds the core layer 18. Therefore, the core layer 18 and the backing layer 20 are co-extruded such that the backing layer 20 is bonded to the core layer 18. The core layer 18 may be formed from nylon (e.g., nylon 12 and the like). The backing layer 20 may be formed from nylon (e.g., nylon 6, nylon 11, nylon 12, nylon 66, nylon 612, and/or combinations thereof). The core tube 12 may also be formed from any other process or from any other materials known to those skilled in the art. The core tube 12 is generally impervious to fluid flow through the wall. The core tube 12 may have a first wall thickness 22 that is between 0.030-0.060 inches. However, it should be appreciated that any other wall thickness may be used as known to those skilled in the art.

Figure 2:
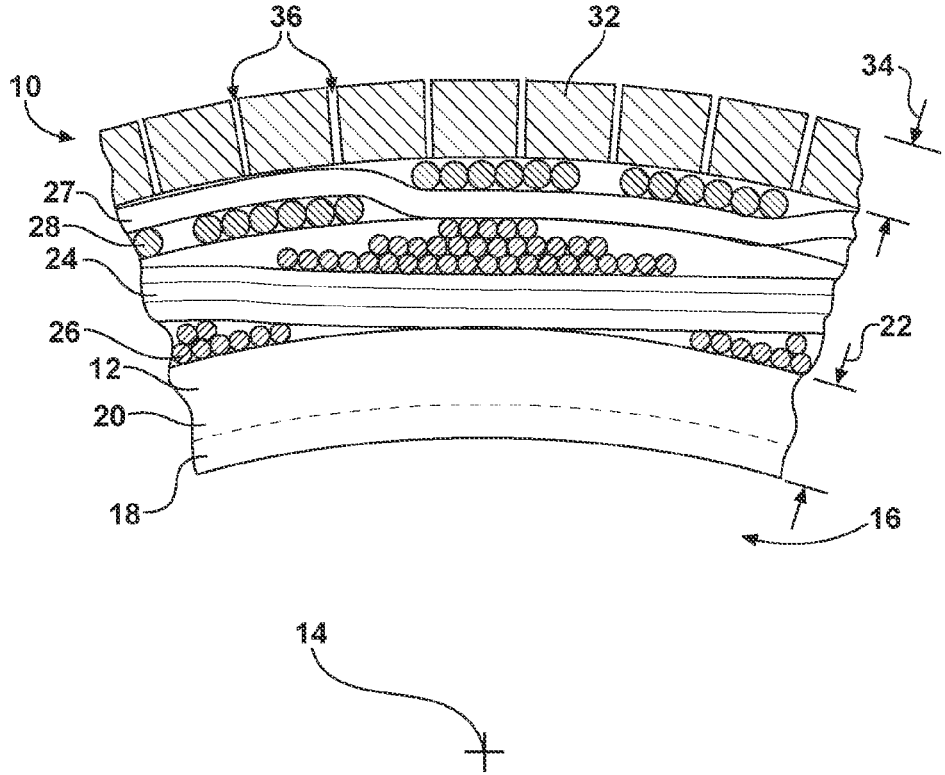
FIG. 2 is a partial cross-sectional end view of the hose of FIG. 1.

A first layer 24 extends about the core tube 12, as shown in FIGS. 1 and 2. The first layer 24 is formed by braiding a plurality of first fibers 26. More specifically, the first layer 24 may be a braided reinforcement that is braided from between 12 and 36 bobbins. Preferably, the first layer 24 is braided from 24 bobbins. Each bobbin includes at least one of the first fibers 26. The first fibers 26 have a linear density of at least 15,400 denier and are applied at a first braid angle A1 of between 52 and 56 degrees, relative to the central axis 14. Preferably, the first braid angle A1 of the first fibers is about 54 degrees, relative to the central axis 14. Therefore, the first fibers 26 are braided and wound around the core tube 12. The tenacity (breaking force) of the first fibers 26 may be between 8 and 12 grams per denier (gpd). The first fibers 26 may be formed from polyester, nylon, and the like. The polyester may be any type of industrial grade polyester known to those skilled in the art. The nylon may be nylon 66. However, other materials known to those skilled in the art may also be used.

A second layer 28 extends about an exterior surface 30 of the first layer 24 such that the second layer 28 is directly disposed on the exterior surface 30, as shown in FIGS. 1 and 2. The second layer 28 is formed by braiding a plurality of second fibers 27. More specifically, the second layer 28 may be a braided reinforcement that is braided from between 12 and 36 bobbins. Preferably, the second layer 28 is braided from 24 bobbins. Each bobbin includes at least one of the second fibers 27. The second fibers 27 may be formed from aramid fibers. More specifically, the aramid fibers may be para-aramid fibers (e.g., Kevlar® and the like). The second fibers 27 are at least 5,680 denier and are applied over the first layer 24 at a second braid angle A2 of between 28 and 32 degrees, relative to the central axis 14. Preferably, the second braid angle A2 is about 30 degrees, relative to the central axis 14. Therefore, the second fibers 27 are braided and wound directly around the exterior surface 30 of the first layer 24. The tenacity of the second fibers 27 is at least 23 gpd with a maximum elongation at break of 4%. Preferably, the maximum elongation at break of the second fibers 27 is about 3.6%. The tensile strength of the second fibers 27 is preferably between 500 and 555 gpd.

A sheath 32 extends about the second layer 28, as shown in FIGS. 1 and 2. The sheath 32 may be formed from nylon. More specifically the nylon may be nylon 6, nylon 11, nylon 12, nylon 66, nylon 612, and/or combinations thereof. The sheath 32 may be extruded over the second layer 28. It should be appreciated that the sheath 32 may be applied over the second layer 28 with any other method known to those skilled in the art. The sheath 32 may have a second wall thickness 34 of between 0.030 and 0.060 inches. Referring to FIG. 2, the sheath 32 defines a plurality of perforations 36 that extend through the wall. If any gas or fluid should seep between the sheath 32 and the core tube 12, the perforations 36 prevent a buildup of the gas and/or fluid which would typically result in bubbling of the sheath 32. The sheath may be compounded to provide abrasion and chemical resistance to the supply hose 10.

While the best modes for carrying out the invention have been described in detail, those familiar with the art to which this invention relates will recognize various alternative designs and embodiments for practicing the invention within the scope of the appended claims.

The invention claimed is:

1. A supply hose comprising:
   a core tube extending along a central axis and defining a hollow interior;
   wherein said core tube includes a core layer defining said hollow interior and a backing layer surrounding said core layer;
   wherein said backing layer and said core layer are co-extruded such that said backing layer is bonded to said core layer;
   a first layer disposed about said backing layer and presenting an exterior surface;
   wherein said first layer includes a plurality of first fibers braided about said core tube at a first angle of between approximately 52 degrees and 56 degrees, relative to said central axis;
   a second layer disposed directly on said exterior surface of said first layer;
   wherein said second layer includes a plurality of second fibers braided about said exterior surface of said first layer at a second angle of between approximately 28 degrees and 32 degrees, relative to said central axis;
   wherein the first layer and the second layer are the only two layers having fibers which are braided; and
   a sheath disposed about said second layer;
   wherein a combination of said core tube, said first layer, said second layer, and said sheath are configured to support up to at least 4,000 pounds with a tensile strain up to at least 10% before failure.

2. A supply hose, as set forth in claim 1, wherein said core layer is formed from nylon 11.

3. A supply hose, as set forth in claim 1, wherein said sheath defines a plurality of perforations extending therethrough.

4. A supply hose, as set forth in claim 1, wherein said sheath is formed from nylon selected from the group of nylon 6, nylon 11, nylon 66, and nylon 612.

5. A supply hose, as set forth in claim 2, wherein said backing layer is formed from nylon selected from a group of nylon 6, nylon 11, nylon 12, nylon 66, and nylon 612.

* * * * *